(12) United States Patent
Urata et al.

(10) Patent No.: US 6,699,932 B2
(45) Date of Patent: Mar. 2, 2004

(54) BINDER RESIN COMPOSITION FOR HIGH-SOLID PRIMER

(75) Inventors: Keiji Urata, Tokyo (JP); Keizo Ozaki, Tokyo (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 119 days.

(21) Appl. No.: 10/094,618

(22) Filed: Mar. 12, 2002

(65) Prior Publication Data

US 2003/0055163 A1 Mar. 20, 2003

(30) Foreign Application Priority Data

Apr. 25, 2001  (JP) ....................... 2001-127109
Jan. 24, 2002  (JP) ....................... 2002-015113

(51) Int. Cl.$^7$ ................. C09D 151/00; C08L 23/28
(52) U.S. Cl. ................................ 525/64; 525/66
(58) Field of Search .................... 525/64, 66

(56) References Cited

U.S. PATENT DOCUMENTS 6,586,525 B1 * 7/2003 Urata et al. ................... 525/63

FOREIGN PATENT DOCUMENTS

JP          09-176562    *  7/1997

OTHER PUBLICATIONS

*Shinto Paint Co. Ltd et al.*, "Surface Treating Agent", Publication No. 57–036128, Publication Date: Feb. 26, 1982.
*Sanyo Chem. Ind. Ltd.*, "Coating Agent", Publication No. 59–166534, Publication Date: Sep. 19, 1964.
*Mitsui Petrochem Ind. Ltd.*, "Undercoating Agent for Coating of Polyolefin Molded Article", Publication No. 60–099138, Publication Date: Jun. 3, 1985.
*Mitsui Petrochem Ind. Ltd.*, "Primer Composition and Method for Coating Using the Same Composition", Publication No. 04–248845, Publication Date: Sep. 4, 1992.
*Mitsui Petrochem Ind. Ltd.*, "Primer Composition", Publication No. 05–025405, Publication Date: Feb. 2, 1993.
*Mitsui Petrochem Ind. Ltd.*, "Primer Composition", Publication No. 05–025404, Publication Date: Feb. 2, 1993.
*Mitsui Petrochem Ind. Ltd.*, "Primer Composition", Publication No. 05–112750, Publication Date: May 7, 1993.
*Mitsui Petrochem Ind. Ltd.*, "Primer Composition", Publication No. 05–112751, Publication Date: May 7, 1993.
*Sanyo Kokusaku Pulp Co. Ltd.*, "Composition for Polypropylene Resin", Publication No. 59–075968, Publication Date: Apr. 28, 1984.
*Sanyo Kokusaku Pulp Co. Ltd.*, "Curable Coating Composition for Polypropylene Resin", Publication No. 60–223831, Publication Date: Nov. 8, 1985.
*Mitsui Petrochem Ind. Ltd.*, "Primer Composition and its Production", Publication No. 06–100032, Publication Date: Apr. 16, 1996.
*Sanyo Chem. Ind. Ltd.*, "Coating Agent", Publication No. 07–247381, Publication Date: Sep. 26, 1995.
*Sanyo Chem. Ind. Ltd.*, "Coating Agent", Publication No. 07–247382, Publication Date: Sep. 26, 1995.
*Honda Motor Co. Ltd.*, "Primer Composition for Polyolefin", Publication No. 10–158447, Publication Date: Jun. 16, 1996.
*Nippon Paper Industries Co. Ltd.*, "Binder Resin for Polyolefin Resin, Its Production and Use", Publication No. 2000–198807, Publication Date: Jul. 18, 2000.
Abstract: U.S. patent No. 5,863,646, application No. 622,194, filed: Mar. 25, 1996, "Coating Composition for Plastic Substrates and Coated Plastic Articles".

* cited by examiner

Primary Examiner—Jeffrey Mullis
(74) Attorney, Agent, or Firm—Oblon, Spivak, McClelland, Maier & Neustadt, P.C.

(57) ABSTRACT

Provided is a binder resin composition for high-solid primer with excellent high-octane gasohol resistance, adherence, warm water resistance, moisture resistance, etc., when painting onto polyolefinic resins. The binder resin composition is for a high-solid primer characterized by formulating one set or two or more sets of mixtures selected from alcoxylated melamine with carbamate group-containing compound, alcoxylated melamine with hydroxyl group-containing compound, and isocyanate group-containing compound with hydroxyl group-containing compound, to a mixture of particular carboxyl group-containing chlorinated polyolefin with ketonic resin.

2 Claims, No Drawings

BINDER RESIN COMPOSITION FOR HIGH-SOLID PRIMER

DETAILED DESCRIPTION OF THE INVENTION

1. Technical Field to which the Invention Belongs

The present invention relates to a binder resin composition for high-solid primer to be used for the purpose of protection or beautiful ornament of polyolefinic resins, for example, polypropylene, polyethylene, ethylene-propylene copolymer, ethylene-propylene-diene copolymer, etc.

2. Prior Arts

Because of high productivity, broad freedom in design and many advantages such as light weight, antirust and shock resistance, plastics are used very frequently as materials of automotive parts, electric parts, building materials, food packaging films, etc. Above all, because of low price and many excellent properties such as moldability, chemical resistance, heat resistance, water resistance and good electrical characteristics, polyolefinic resins are used extensively as industrial materials, and are one of materials that the growth of demand is most expected in future.

Different from synthetic resins with polarity such as polyurethane resin, polyamide resin, acrylic resin and polyester resin, however, polyolefinic resins are nonpolar and crystalline, hence they have drawbacks of difficult painting and adhesion. For the painting and adhesion of such polyolefinic resins with difficult adherence, low chlorinated polyolefins with strong adherence to polyolefinic resins are used as binder resins.

For example, chlorinated polypropylene or chlorinated propylene-α-olefin copolymer containing carboxylic acid and/or carboxylic anhydride (Japanese Unexamined Patent Publication Nos. Sho 57-36128 and Sho 59-166534, Japanese Patent Publication No. Sho 63-36624), composition having modified copolymer graft copolymerized with α,β-unsaturated vinyl monomer containing hydroxyl group onto styrene•conjugated diene block copolymer followed by further chlorination as an essential component (Japanese Unexamined Patent Publication Nos. Hei 4-248845 and Hei 5-25405), composition having chlorinated product of graft modified styrene-isoprene block copolymer as an essential component (Japanese Unexamined Patent Publication No. Hei 5-25404), composition having chlorinated product of graft modified propylene•ethylene•α-olefin random copolymer as an essential component (Japanese Unexamined Patent Publication Nos. Hei 5-112750 and Hei 5-112751), method for crosslinking carboxyl group-containing chlorinated polyolefin with epoxy resin (Japanese Patent Publication Nos. Sho 63-50381 and Hei 01-16414, Japanese Unexamined Patent Publication No. Hei 8-100032), composition having modified chlorinated polyolefin obtained by reacting carboxyl group-containing chlorinated polyolefin with low-molecular diol or low-molecular compound with hydroxyl group and amino group as an essential component (Japanese Unexamined Patent Publication Nos. Hei 7-247381 and Hei 7-247382), composition mixed carboxyl group-containing chlorinated polyolefin with acrylic modified chlorinated polyolefin (Japanese Unexamined Patent Publication No. Hei 10-158447), carboxyl group-containing chlorinated polyolefin with particular molecular weight distribution (Japanese Unexamined Patent Publication No. 2000-198807), etc. are proposed.

In recent years, volatile organic compounds (VOC) contained in paint and ink are desired to be reduced, since they become the source of air pollution. As one of reducing methods, high solidification of paint (primer) and ink can be considered.

However, if conventional compositions aforementioned are highly solidified, then the viscosity of primer increases because of too high molecular weight, making the spray painting impossible. Hence, they cannot be used as binder resins for high-solid primers.

For using these compositions as high-solid primers, a method for mixing low molecular weight alkyd resin, acrylic resin, polyester resin, polyurethane resin, etc. is considered. However, since these low molecular weight resins are liable to dissolve into gasohol (a mixed solution of gasoline with alcohol added with 10% lower alcohol such as methanol or ethanol to regular gasoline), they have drawbacks of decreasing gasohol resistance. Besides, the gasohol resistance is an index that becomes a criterion of solvent resistance and is measured by soaking a painted plate into gasohol to judge whether is good or poor by the time until the coated film peels off.

There, for solving said problem, the inventors proposed a binder resin composition for high-solid primer, characterized by containing carboxyl group-containing chlorinated polyolefin with particular molecular weight distribution and ketonic resin (Japanese Patent Application No. 2000-239697). This method was excellent in the gasohol resistance, but the high-octane gasohol resistance that uses a mixed solution of high-octane gasoline consisting of regular gasoline and toluene with alcohol could not be satisfied.

SUBJECT TO BE SOLVED BY THE INVENTION

The invention provides a binder resin composition for high-solid primer excellent not only in the adherence and gasohol resistance, but also in the high-octane gasohol resistance, to be used for painting moldings, sheets, etc. of polyolefinic resin.

MEANS TO SOLVE THE SUBJECT

The primer composition of the invention to solve said subject is a binder resin composition for high-solid primer, characterized by formulating 10 to 200 parts by weight of (A-3) shown below to 100 parts by weight of a mixture of (A-1) with (A-2) shown below within a range of mixing ratio by weight of (A-1/A-2) of 90/10 to 50/50.

(A-1): Carboxyl group-containing chlorinated polyolefin graft copolymerized with 1 to 10% by weight of at least one kind of unsaturated carboxylic acid monomer selected from carboxylic acids and/or carboxylic anhydrides onto polyolefin (I), and then chlorinated to a chlorine content of 10 to 30% by weight, the carboxyl group-containing chlorinated polyolefin (II) having not more than 2% by weight of component with weight average molecular weight of 2,000 being low-molecular weight region of said carboxyl group-containing chlorinated polyolefin and ratio ($M_w/M_n$) of weight average molecular weight ($M_w$) to number aver-age molecular weight ($M_n$) of 1.5 to 3.5.

(A-2): Ketonic resin with number average molecular weight of 500 to 2,000.

(A-3): Combination of one set or two or more sets selected from alcoxylated melamine and carbamate group-containing compound, alcoxylated melamine and hydroxyl group-containing compound, and isocyanate group-containing compound and hydroxyl group-containing compound.

EMBODIMENT TO PUT THE INVENTION INTO PRACTICE

In following, the invention will be explained in detail.

In the invention, (A-1) and (A-2) form the skeleton of binder resin. (A-1) is a component to provide the adherence to polyolefin and (A-2) is a low-molecular weight component indispensable for high solidification. (A-3) is a component that causes the crosslinking reaction when baking upper paint and is used for improved high-octane gasohol resistance.

Explanation on (A-1)

The carboxyl group-containing chlorinated polyolefin (II) to be used in the invention can be obtained by melting polyolefin (I) under heating, decreasing viscosity or degrading it through thermal decomposition, if need be, graft copolymerizing with unsaturated carboxylic acid monomer of carboxylic acid and/or carboxylic anhydride onto it batchwise or continuously in the presence of radical generator, and then chlorinating. Also, it can be obtained by dissolving polyolefin (I) into sol-vent at 100° C. or higher in a reactor equipped with stirrer or autoclave, graft copolymerizing with unsaturated carboxylic acid monomer in solution in the presence of radical generator, and then chlorinating.

For the raw material polyolefins (I), crystalline polypropylene, noncrystalline polypropylene, propylene-α-olefin copolymer, etc. can be used solely or by mixing two or more kinds. In particular, from the points of workability and adhesiveness of binder resin, crystalline polypropylene with weight average molecular weight of 10,000 to 150,000, propylene-α-olefin copolymer with weight average molecular weight of 10,000 to 150,000 containing 70 to 97 mol % of propylene component, the number of carbons of α-olefin being 2 or 4 to 6, or ternary copolymer of propylene-butene-ethylene with weight average molecular weight of 10,000 to 150,000 containing 70 to 97 mol % of propylene component, 2 to 25 mol % of butene component and 2 to 25 mol % of ethylene component is preferable. In the case of propylene-α-olefin copolymer, α-olefin unit is preferable to be at least one kind of α-olefin with number of carbons of 2 or 4 to 6, selected from, for example, ethylene, 1-butene, 1-pentene, 4-methyl-1-pentene, 3-methyl-1-pentene and 1-hexene.

If the weight average molecular weight of raw material polyolefin (I) is under 10,000 or the propylene component is under 70 mol %, then the adherence to polyolefinic resin, gasoline resistance, heat resistance and ultraviolet resistance are aggravated. If the weight average molecular weight is over 150,000, then the primer does not become fine particles when painting by air spray etc. and the beautiful appearance is spoiled, which is unpreferable. Also, the number of carbons of a-olefin in propylene-α-olefin copolymer is over 6, then the adherence to polyolefinic resin becomes poor. Moreover, the propylene content of propylene-butene-ethylene copolymer being ternary copolymer is preferable to be 70 to 97 mol % as described above, the butene content is preferable to be 2 to 25 mol % and the ethylene content is preferable to be 2 to 25 mol %.

Unsaturated carboxylic acid monomers capable of being used for introducing carboxyl group include acrylic acid, methacrylic acid, maleic acid, maleic anhydride, fumaric acid, itaconic acid, itaconic anhydride, aconitic acid and aconitic anhydride. These can be used for graft copolymerization at a level of 1 to 10% by weight to polyolefin. If under 1% by weight, then the gasohol property is aggravated. If over 10% by weight, then the adherence to polyolefinic resin is aggravated and, at the same time, increased viscosity of solution due to hydrogen bonding is seen, resulting in gelation on preservation or poor workability by air spray etc.

The radical generators to be used for the graft copolymerization between polyolefin (I) and unsaturated carboxylic acid monomer include, for example, peroxides such as di-tert-butyl peroxide, tert-butyl hydroperoxide, dicumyl peroxide, benzoyl peroxide, tert-butyl peroxide benzoate, methyl ethyl ketone peroxide and di-tert-butyl perphthalate, and azonitriles such as azobisisobutyronitrile.

The carboxyl group-containing chlorinated polyolefin (II) to be used in the invention can be used at a chlorine content of 10 to 30% by weight. If the chlorine content is under 10% by weight, then the solubility into organic solvents such as toluene and xylene is poor and homogeneous solution cannot be obtained, resulting in the gelation at low temperature or generation of grains, making it impossible to apply to binder resin for primer or base coating. If the chlorine content is over 30% by weight, then the adherence to polyolefinic resin and the gasoline resistance are aggravated, which is unpreferable.

The less the component in the low-molecular weight region of carboxyl group-containing chlorinated polyolefin (II) to be used in the invention, the better the heat resistance, ultra-violet resistance and gasohol resistance. That is, if the component with weight average molecular weight of 2,000 or less is contained over 2% by weight, then these physical properties are aggravated remarkably. Moreover, the carboxyl group-containing chlorinated polyolefin (II) can be used at a ratio of weight average molecular weight ($M_w$) to number average molecular weight ($M_n$), that is, the value of $M_w/M_n$ of 1.5 to 3.5. If $M_w/M_n$ is under 1.5, then the adherence to polyolefin becomes poor, and, when it exceeds 3.5 by increasing the component in high-molecular weight region, the high solidification becomes difficult. Also, when painting by air spray etc., the primer does not become fine particles and the beautiful appearance of coated surface is spoiled, which is unpreferable. When it exceeds 3.5 by increasing the component in low-molecular weight region, the heat resistance, ultraviolet resistance and gasoline resistance are aggravated.

Besides, the content of low-molecular weight component with weight average molecular weight of 2,000 or less and the ratio of weight average molecular weight ($M_w$) to number average molecular weight ($M_n$), that is, $M_w/M_n$ were determined by means of gel permeation chromatography (GPC) using polystyrene with known molecular weight and narrow molecular weight distribution as a standard substance.

The carboxyl group-containing chlorinated polyolefin (II) to be used in the invention can be obtained by completely dissolving polyolefin graft copolymerized with unsaturated carboxylic acid under warming into solvents for chlorinating reaction, for example, chloroform, carbon tetrachloride, tetrachloroethylene, tetrachloroethane, etc., and then by blowing-in chlorine gas for reacting under pressure or ambient pressure in the presence of radical generator as described above, or under irradiation of ultraviolet rays, or in the absence of these radical generator and ultraviolet rays. The chlorinating reaction is conducted ordinarily at a temperature between 60° C. and 120° C.

As the methods for removing low-molecular weight component of carboxyl group-containing chlorinated polyolefin (II), two ways of (1) a method for removing low-molecular weight component in carboxyl group-containing polyolefin before chlorination by extracting with solvent, and (2) a method for removing low-molecular weight component in carboxyl group-containing chlorinated polyolefin after chlorination by extracting with solvent can be proposed.

For removing the low-molecular weight component by the method (1), carboxyl group-containing polyolefin before chlorination is made powery, granular, pelletal or molten state, sole solvent or mixed solvent selected from a group of aliphatic hydrocarbon, aromatic hydrocarbon, alicyclic hydrocarbon, halogenated hydrocarbon, alcohols, esters, ketones and ethers with boiling point of 120° C. or lower is added, and the low-molecular weight component is dissolved out into these solvents within a temperature range of 10 to 100° C., thereby it can be removed. Moreover, in the case of carboxyl group-containing polyolefin obtained by dissolving polyolefin (I) into solvent at 100° C. or higher in a reactor equipped with stirrer or autoclave and graft copolymerizing with unsaturated carboxylic acid monomer in solution in the presence of radical generator, the reaction liquor is put in said solvent as it is and the precipitates are filtered, thereby the low-molecular weight component can be removed.

The reason why the boiling point of solvent was made to be 120° C. or lower is because of that, if the boiling point id too high, the low-molecular weight component is liable to remain in the carboxyl group-containing polyolefin or carboxyl group-containing chlorinated polyolefin, and said solvent is chlorinated or the physical properties of primer are decreased, which is unpreferable.

The reason why the temperature on extraction was made to be 10 to 100° C. is because of that, if under 10° C., then the removal of low-molecular weight component by extraction becomes incomplete, which is unpreferable. Also, if over 100° C., even the high-molecular weight component is removed and the recovery rate decreases, which is unpreferable. When using the solvent with boiling point of 100° C. or lower, it is preferable to perform the solvent extraction in a completely closed pressure vessel.

The method for removing the low-molecular weight component by the method (2) is also possible following the method (1) using carboxyl group-containing chlorinated polyolefin. In the case of carboxyl group-containing chlorinated polyolefin being in solution, the temperature on extraction is preferable to be as low as possible. If under 0° C., however, the viscosity becomes too high, hence the solvent extraction of low-molecular weight component cannot be performed efficiently. Also, if becoming higher than room temperature, the carboxyl group-containing chlorinated polyolefin dissolves into extracting solvent in large quantities and the recovery rate decreases, which is unpreferable. In the case of carboxyl group-containing chlorinated polyolefin being solid article, the extracting temperature is preferable to be higher, but, if over 100° C., dehydrochloric acid etc. are caused to become unstable, which is unpreferable.

As the representatives of solvents with boiling point of 120° C. or lower for removing the low-molecular weight component, in the case of aliphatic hydrocarbon, pentane, 2-methylpentane, hexane, 2,2-dimethylbutane, 2,3-dimethylbutane, heptane, 2-methylhexane, 3-methylhexane, 2,4-dimethylpentane, petroleum ether, petroleum benzine, etc. can be exemplified. In the case of aromatic hydrocarbon, benzene, toluene, etc. can be exemplified. In the case of alicyclic hydrocarbon, cyclopentane, methylcyclopentane, cyclohexane, methylcyclohexane, ethylcyclohexane, etc. can be exemplified. In the case of halogenated hydrocarbon, trichloromethane, tetrachloromethane, 1,1-dichloroethane, 1,2-dichloroethane, 1,1,1-trichloroethane, 1,1,2-trichloroethane, 1,1-dichloroethylene, 1,2-dichloroethylene, trichloroethylene, etc. can be exemplified. In the case of alcohols, methanol, ethanol, 2-propanol, 1-butanol, 2-butanol, isobutyl alcohol, tert-butyl alcohol, 2-pentanol, 3-pentanol, etc. can be exemplified. In the case of esters, propyl formate, butyl formate, methyl acetate, ethyl acetate, propyl acetate, isopropyl acetate, isobutyl acetate, sec-butyl acetate, etc. can be exemplified. In the case of ketones, acetone, methyl ethyl ketone, 2-pentanone, 3-pentanone, methyl isobutyl ketone, etc. can be exemplified. In the case of ethers, diethyl ether, dipropyl ether, diisopropyl ether, etc. can be exemplified.

Explanation on (A-2)

For the ketonic resins with number average molecular weight of 500 to 2000 to be used in the invention, polycondensation products obtainable by condensing ketones (cyclohexanone, methylcyclohexanone, acetophenone, etc.) with formaldehyde can be used. In addition, those hydrogenated the ketonic portion obtained can also be used. The properties of resin differ depending on the type of raw material ketone and molecular weight of resin, but it is a faintly colored solid resin with softening point of around 70 to 120° C. and has features of excel-lent weather resistance, adherence, hardness, etc.

Said ketonic resin can be used within a range of number average molecular weight of 500 to 2000. If the number average molecular weight is under 500, then the cohesion is poor and the adherence is aggravated. If over 2000, the high solidification of primer becomes difficult.

Besides, the number average molecular weight is a value determined by means of gel permeation chromatography (GPC) using polystyrene with known molecular weight and narrow molecular weight distribution aforementioned as a standard substance.

Explanation on (A-3)

Alcoxylated melamine to be used in the invention can be obtained by publicly known methods (e.g. Handbook of Paint, p.224–230, 1965, published by The Nikkan Kogyo Shimbun Ltd., etc.). Melamine and formaldehyde are reacted under warming to produce methylolmelamine. Then, by reacting this with alcohol, alcoxylated melamine can be obtained. Typically, methylated methylolmelamine, butylated methylolmelamine, isobutylated methylolmelamine, etc. can be mentioned. Moreover, commercial products such as Melan (trade mark, from Hitachi Chemical Co., Ltd.) and Super Beckamine (trade mark, from Dainippon ink and Chemicals, Inc.) can also be used. Carbamate group-containing compound is a compound having carbamate group (—O—CO—NHR, R=H or alkyl (preferably alkyl with number of carbons of 1 to 6 or cycloalkyl with number of ring carbon atoms of up to 6), and, in particular, H is preferable). Compounds such as carbamate-based poly (meth)acrylics copolymerized isocyanate-based monomer with unsaturated group with (meth) acrylic monomer etc. and carbamate-based oligomer obtainable through following reaction formulae can be used, if they have two or more carbamate groups in one molecule. Moreover, compounds obtainable by other publicly known methods (e.g. Japanese Unexamined Patent Publication No. Hei 8-231642, U.S. Pat. Nos. 3,479,328, 3,674,838, 4,126,747, 4,279,833, 4,340, 497, 4,758,632 and 5,356,669, P. Adams & F. Baron, "Esters of Carbamic Acid", Chemical Review, v65, 1965, etc.) can also be used.

[Chemical Formula 1]

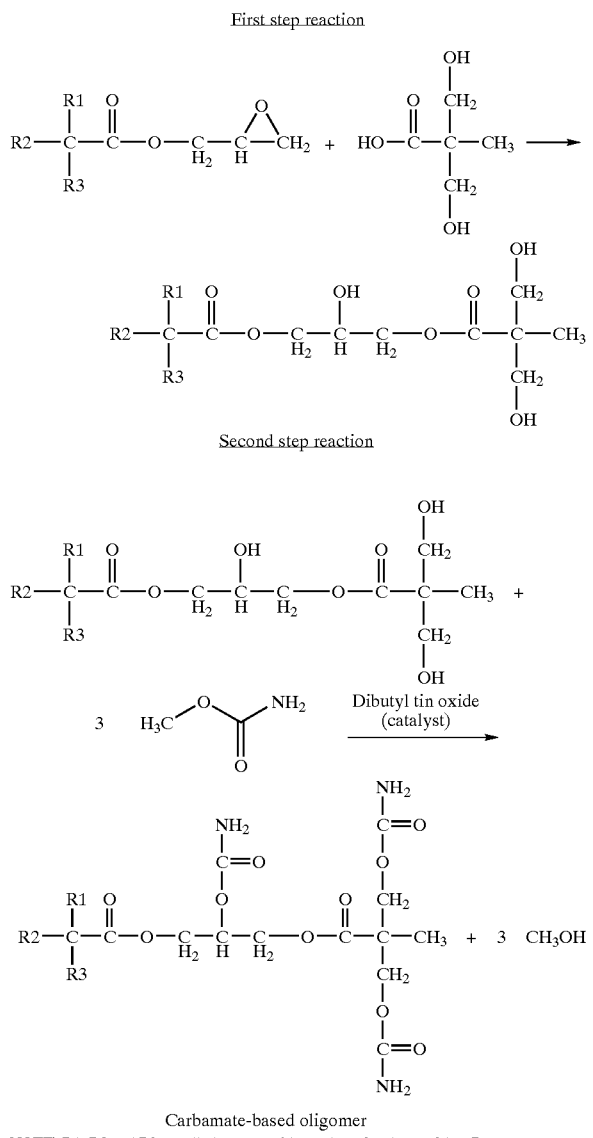

Carbamate-based oligomer
NOTE) R1, R2 and R3 are alkyl groups with number of carbons of 1 to 7

Hydroxyl group-containing compounds include high-molecular polyols such as acrylic polyol, polyester polyol and polyether polyol, alkyd resins, and liquid rubber and liquid polybutadiene with hydroxyl groups at both ends of molecule, etc. In addition, hydrogenated liquid rubber and hydrogenated liquid polybutadiene with hydrogens added to double bonds in said liquid rubber and liquid polybutadiene, etc. can be used, if they are compounds with two or more hydroxyl groups in one molecule.

Isocyanate group-containing compounds mean aromatic, aliphatic and alicyclic organic diisocyanates and include, for example, tolylenediisocyanate, xylenediisocyanate, 1,5-naphthalenediisocyanate, 1,4-tetramethylenediisocyanate, 1,6-hexamethylenediisocyanate, 2,2,4-trimethylhexamethylenediisocyanate, isophoronediisocyanate, 4,4-dicyclohexylmethanediisocyanate and 1,4-cyclohexyldiisocyanate. Moreover, it may also be safe to modify these organic diisocyanates to isocyanate derivatives such as burette form, isocyanurate form and trimethylolpropane adduct form for use, hence all compounds can be used, if they have two or more isocyanate groups in one molecule. Furthermore, block isocyanate compounds blocked said isocyanates with blocking agent can be used. The blocking agents include, for example, oximes such as methyl ethyl ketoxime, cyclohexanone oxime, formaldoxime and acetoaldoxime, phenolics such as phenol and cresol, alcoholics such as methanol, benzyl alcohol and ethyleneglycol monomethyl ether, active methylenes such as methyl acetoacetate and dimethyl malonate, amides such as acetanilide and acetamide, other imides, amines, imidazoles, ureas, carbamates, imines, mercaptans, sulfites and lactams.

Among said compounds, mixture of alcoxylated melamine with carbamate group-containing compound, mixture of alcoxylated melamine with hydroxyl group-containing compound, mixture of isocyanate group-containing compound with hydroxyl group-containing compound, etc. can be used. As for the mixing ratio of respective compounds, effect can be recognized at an arbitrary mixing ratio, but, preferably, the mixing ratio is within a range of 2/8 to 8/2 by solid weight. These mixtures can be used plurally.

Moreover, for the purpose of promoting the reaction between alcoxylated melamine and carbamate group-containing compound, or alcoxylated melamine and hydroxyl group-containing compound, acidic catalysts such as hydrochloric acid, nitric acid, phosphoric acid and organic acid can be used. For example, they are alcohol solution of hydrochloric acid, salts of strong acid such as ammonium chloride, phosphoric esters such as monobutyl phosphate, organic sulfonic acids such as p-toluenesulfonic acid, etc., and these can be used solely or by mixing two or more kinds.

In the invention, the mixing ratio by weight of (A-1)/(A-2) is within a range of 90/10 to 50/50. In said mixing system, if (A-1) is under 50, then the adherence to polyolefinic substrate and the gasohol resistance are aggravated. If (A-1) is over 90, then the high solidification becomes difficult.

Moreover, to 100 parts by weight of mixture with mixing ratio by weight of (A-1)/(A-2) within a range of 90/10 to 50/50, the optimum formulating proportion of (A-3) is 10 to 200 parts by weight. If under 10 parts by weight, the gasohol resistance does not improve. If over 200 parts by weight, then the adherence to polyolefinic substrate becomes poor, which is unpreferable.

To the inventive binder resin composition for high-solid primer, titanium dioxide, talc, coloring pigment, etc. are added within a range not injuring the effect of the invention, and, if need be, other additives, for example, ultraviolet absorber, antioxidant, sedimentation preventer for pigment, etc. are added and kneaded, thereby the high-solid type primer can be produced.

EXAMPLE

In following, the invention will be illustrated concretely based on examples, but the invention is not confined thereto.

Producing Example-1

In a three-neck flask equipped with stirrer, dropping funnel and cooling pipe for refluxing monomer were placed 5 kg of crystalline polypropylene with weight average molecular weight of 40,000, which was molten sufficiently in an oil bath kept constant at 180° C. The inside of flask was replaced with nitrogen and, while stirring, 300 g of maleic anhydride were put-in over about 5 minutes. Next, a solution of 20 g of di-tert-butyl peroxide dissolved into 50 ml of heptane was put-in from dropping funnel over about 30 minutes. At this time, the inside of system was kept at 180° C. and the reaction was continued further for 15 minutes. Then, while reducing the pressure in flask with aspirator, unreacted maleic anhydride was removed over about 30 minutes to obtain maleic anhydride-modified polypropylene.

Next, after cooling to ambient temperature, this product was pulverized, and 5 kg thereof were put in a pressure vessel equipped with stirrer. Then, 5 kg of n-hexane (bp. 68.7° C.) and 5 kg of methyl ethyl ketone (bp. 79.6° C.) were put-in and, while stirring for 4 hours at 100° C., the low molecular weight component was dissolved out into solvent. Following this, solvent was taken off by filtration and, after washing with said solvents, the filtration residue was dried for 24 hours at 70° C. in a blast drier to obtain 4.65 kg of maleic anhydride-modified polypropylene with low molecular weight component removed. The content of maleic anhydride was 3.6% by weight.

Next, 4 kg of maleic anhydride-modified polypropylene with low molecular weight component removed were put in a glass-lined reactor and 80 liters of chloroform were added to dissolve sufficiently at 120° C. under pressure of 4 kg/cm$^2$. While keeping the temperature at 110° C., chlorine gas was blown-in from the bottom of reactor and the chlorinating reaction was conducted until the chlorine content became 25% by weight. Solvent chloroform was distilled off by evaporator and replaced with a mixed solvent of toluene/cyclohexane=65/35 (wt.). Then, stabilizer (Epicote 828, condensation product of bisphenol A with epichlorohydrin and an epoxy resin with epoxy equivalent of 184to 194, from Shell Chemicals Corp.) was added in amount of 4% based on solids, and the concentration was adjusted to obtain carboxyl group-containing chlorinated polypropylene (a-I) as a solution of 20% solid concentration. When determining the molecular weight of (a-I), $M_w/M_n$=2.54 and the content of low molecular weight component with molecular weight of 2,000 or less was 0.35% by weight.

Producing Example-2

In a three-neck flask equipped with stirrer, dropping funnel and cooling pipe for refluxing monomer were placed 5 kg of propylene-butene-ethylene copolymer (ternary copolymer) containing 75 mol % of propylene component, 17 mol % of butene component and 8 mol % of ethylene component with weight average molecular weight of 120,000, which was molten sufficiently in an oil bath kept constant at 180° C. The inside of flask was replaced with nitrogen and, while stirring, 350 g of maleic anhydride were put-in over about 5 minutes. Next, a solution of 35 g of dicumyl peroxide dissolved into 50 ml of heptane was put-in from dropping funnel over about 30 minutes. At this time, the inside of system was kept at 180° C. and the reaction was continued further for 15 minutes. Then, while reducing the pressure in flask with aspirator, unreacted maleic anhydride was removed over about 30 minutes to obtain maleic anhydride modified propylene-butene-ethylene copolymer.

Next, this maleic anhydride-modified propylene-butene-ethylene copolymer was made pelletal, and 5 kg thereof were put in a three-neck flask equipped with stirrer and cooling pipe for refluxing monomer. Then, 10 kg of ethyl acetate (bp. 77.1° C.) were put-in and, while refluxing solvent for 4 hours at 77° C., the low molecular weight component was dissolved out into solvent. Following this, solvent was taken off by filtration and, after washing with said solvent, the filtration residue was dried for 24 hours at 70° C. in a blast drier to obtain 4.75 kg of maleic anhydride-modified propylene-butene-ethylene copolymer with low molecular weight component removed. The content of maleic anhydride was 3.9% by weight.

Next, 4 kg of maleic anhydride-modified propylene-butene-ethylene copolymer with low molecular weight component removed were put in a glass-lined reactor, 80 liters of chloroform were added, and the mixture was stirred to dissolve sufficiently at 100° C. under pressure of 3 kg/cm$^2$. Thereafter, while irradiating ultraviolet rays, the reaction temperature was kept at 80° C., chlorine gas was blown-in from the bottom of reactor and the chlorinating reaction was conducted until the chlorine content became 12% by weight. Solvent chloroform was distilled off by evaporator and replaced with toluene. Then, stabilizer (Epicote 828) was added in amount of 4% based on solids and the concentration was adjusted to obtain carboxyl group-containing chlorinated propylene-butene-ethylene copolymer (a-II) as a toluene solution of 20% solid concentration. When determining the molecular weight of (a-II), $M_w/M_n$=3.43 and the content of low molecular weight component with molecular weight of 2,000 or less was 1.38% by weight.

Producing Example-3

In a three-neck flask equipped with stirrer, dropping funnel and cooling pipe for refluxing monomer were placed 5 kg of propylene-ethylene copolymer containing 94 mol % of propylene component and 6 mol % of ethylene component with weight average molecular weight of 50,000, 400 g of maleic anhydride and 7.5 kg of xylene, which was dissolved sufficiently in an oil bath kept constant at 140° C. The inside of flask was replaced with nitrogen and, while stirring, 32 g of di-tert-butyl peroxide were put-in over about 30 minutes. At this time, the inside of system was kept at 140° C. and the reaction was continued further for 6 hours to obtain maleic anhydride-modified propylene-ethylene copolymer.

Next, after cooling to ambient temperature, this maleic anhydride-modified propylene-ethylene copolymer was put in 20 kg of methyl ethyl ketone to deposit crumb-like resin. Solvent was taken off by filtration and, after washing further with methyl ethyl ketone, the filtration residue was dried for 24 hours at 70° C. in a blast drier to obtain 4.7 kg of maleic anhydride-modified propylene-ethylene copolymer with low molecular weight component removed. The content of maleic anhydride was 4.5% by weight.

Next, 4 kg of this maleic anhydride-modified propylene-ethylene copolymer were put in a glass-lined reactor equipped with stirrer and 80 liters of chloroform were added to dissolve sufficiently at 110° C. under pressure of 3 kg/cm. Thereafter, 5 g of reaction catalyst (azobisisobutyronitrile) and chlorine gas was blown-in from the bottom of reactor to conduct the chlorinating reaction until the chlorine content became 17% by weight. After part of solvent chloroform was distilled off by evaporator, stabilizer (tert-butylphenyl glycidyl ether, mono-epoxy) was added in amount of 5% based on solids and the remaining chloroform was removed completely through a vent extruder installed with vent port for distilling it off under reduced pressure to obtain solid product of carboxyl group-containing chlorinated propylene-ethylene copolymer. Next, this solid product was dissolved into toluene, which was adjusted to a toluene solution of 20% solid concentration (a-III). When determining the molecular weight of (a-III), $M_w/M_n$=1.78 and the content of low molecular weight component with molecular weight of 2,000 or less was 0.22% by weight.

Producing Example-4

Producing Example of Carbamate-Based Polyacrylic

In a flask equipped with stirrer, thermometer and cooling pipe for refluxing monomer and solvent were put-in 99 g of aromatic solvent (Solvesso 100, from Exxon-Mobil Corp.) and 113 g of toluene, and, while stirring, temperature was raised to 127° C. and, while refluxing, the inside of flask was purged with nitrogen. Next, 466 g of unsaturated m-tetramethylxyleneisocyanate, 346 g of ethylhexyl acrylate and 134 g of 50% mineral spirit solution of tert-butyl peracetate were taken in another vessel and mixed, which was added into flask over 3.5 hours. Successively, a mixture of 14 g of tert-butyl peracetate with 14 g of aromatic solvent (Solvesso 100) was added over 30 minutes, and, finally, for the purpose of washing the inside of addition system, 4.1 g of aromatic solvent (Solvesso 100) were added. Further, the inside of reaction system was kept at 135° C. and, while refluxing, the reaction was continued for 1 hour. Thereafter, the inside of flask was cooled to 70° C. and 0.6 g of dibutyl tin laurate were added, and the mixture was stirred for 5 minutes. Then, 283 g of hydroxypropylcarbamate were put-in and the mixture was reacted for 30 minutes. Following this, the temperature was raised slowly to 100° C. and the reaction was continued until unreacted isocyanate disappeared. Then, 426 g of ethyleneglycol monomethyl ether were put-in and the reaction was completed. The end point of reaction was made to be a point where no absorption was observed, by measuring the absorption of isocyanate with infrared spectrometer. Besides, the solid content of this carbamate-based polyacrylic was 62% by weight.

Producing Example-5

Producing Example of Carbamate-Based Oligomer

In a flask equipped with stirrer, thermometer and cooling pipe for refluxing monomer and solvent were put-in 450 g of glycidyl neodecanoate and 60 g of dimethylolpropionic acid (hereinafter referred to as DMPA), and the temperature was raised to 128° C. When slight heat generation was caused, 180 g of DMPA were put-in by dividing it thrice and, while keeping at 130° C., the reaction was conducted for 4 to 5 hours. Next, 606 g of methyl carbamate, 5 g of dibutyl tin oxide and 475 g of toluene were added and the mixture was refluxed at 110 to 117° C. While taking off methanol produced, the reaction was continued for 30 hours. Following this, excess methyl carbamate and solvent were removed and 225 g of amyl acetate were added to obtain carbamate-based oligomer with solid content of 80% by weight.

Example 1

Into a mixed solvent of toluene/butyl acetate=80/20 (ratio by weight) were dissolved 100 g of pellets of ketonic resin (Haron 80, from Honshu Chemical Industry Co., Ltd.) to fabricate a solution of 40% by weight. Next, 75 g of said solution of ketonic resin, 250 g of carboxyl group-containing chlorinated polyolefin (a-I-) obtained in Producing example 1, 11.1 g of alcoxylated melamine (Melan 28D, from Hitachi Chemical Co., Ltd.), 21.5 g of carbamate-based polyacrylic (solids 62% by weight) obtained in Producing example 4, 0.3 g of acidic catalyst (20% isopropyl alcohol solution of p-toluenesulfonic acid), 100 g of titanium dioxide and 0.8 g of carbon black were sampled and the mixture was kneaded for 1 hour in a sand grinder mill. Thereafter the concentration was adjusted with xylene so as the solid concentration to become 35%, and the product was spray painted onto a polypropylene plate washed with water so as the film thickness to become 10 μm. After several minutes clear paint (two-component cure type urethane paint) was spray painted so as the film thickness to become 30 to 40 μm, which was dried for about 15 minutes at room temperature and then forcedly dried for 30 minutes at 120° C. After allowed to stand statically further for one day, tests of coated film were performed. The formulation recipe is shown in Table 1 and the test results of coated film are shown in Table 3.

Examples 2 through 6

Based on the formulation recipe shown in Table 1, primers were fabricated by the same method as Example 1 and tests of coated films were performed. The results are shown in Table 3. However, in the fabrication of primer in Example 4, the conversion to paint was made excluding polyisocyanate (Sumidule N-3500, from Sumitomo Bayer Co., Ltd.) and, after the solid adjustment was performed, polyisocyanate was added immediately before painting to paint. This is because of that, if converting to paint after addition of polyisocyanate, then polyisocyanate reacts with hydroxyl group, resulting in the gelation of paint on storage.

Comparative examples 1 through 4

Based on the formulation recipe shown in Table 2, primers were fabricated by the same method as Example 1 and tests of coated films were performed. The results are shown in Table 3.

TABLE 1

Formulation recipe of primers [Example] [Parts by weight]

| Example | 1 | 2 | 3 | 4 | 5 | 6 |
|---|---|---|---|---|---|---|
| Ketonic resin[X1] 40% solution | 75 (30) | 75 (30) | 50 (20) | 100 (40) | 10 (4) | 12.5 (5) |
| (a-I) 20% solution | 250 (50) | — | — | 250 (50) | — | 225 (45) |
| (a-II) 20% solution | — | 200 (40) | — | — | — | — |
| (a-III) 20% solution | — | — | 150 (30) | — | 180 (36) | — |
| Alcoxylated melamine[X2] 60% solution | 11.7 (6.7) | 16.7 (10) | 21.7 (13) | — | 25 (15) | 25 (15) |
| Carbamate-based Polyacrylic 60% solution | 21.5 (13.3) | — | — | — | — | — |
| Carbamate-based | — | 25 | — | — | — | — |

TABLE 1-continued

Formulation recipe of primers [Example] [Parts by weight]

| Example | 1 | 2 | 3 | 4 | 5 | 6 |
|---|---|---|---|---|---|---|
| oligomer 80% solution | — | (20) | — | — | — | — |
| Acrylic polyol[X3] | — | — | — | 12.7 (7.6) | — | — |
| Alkyd resin[X4] 50% solution | — | — | 74 (37) | — | 50 (25) | 30 (15) |
| Liquid polybutadiene with hydroxyl groups at ends[X5] | — | — | — | — | 20 (20) | — |
| Hydrogenated liquid rubber with hydroxyl groups at ends[X6] | — | — | — | — | — | 20 (20) |
| Polyisocyanate[X7] | — | — | — | (2.4) | — | — |
| Acidic catalyst[X8] | 0.3 (0.06) | 0.45 (0.09) | 0.75 (0.15) | — | 0.9 (0.18) | 0.8 (0.16) |
| Titanium dioxide | 100 | 100 | 100 | 100 | 100 | 100 |
| Carbon black | 0.8 | 0.8 | 0.8 | 0.8 | 0.8 | 0.8 |
| Solid concentration of Primer | 35% | 35% | 35% | 35% | 35% | 35% |

Value in bracket means parts of solids by weight.
Ketonic resin[X1]; Trade name Haron 80, softening point; 75~82° C., number average molecular weight; ca. 1000, from Honshu Chemical Industry Co., Ltd.
Alcoxylated melamine[X2]; Trade name Melan 28D, isobutylated melamine, solids 60% by weight, from Hitachi Chemical Co., Ltd.
Acrylic polyol[X3]; Trade name Desmophen A-160, acrylic polyol (hydroxyl group-containing compound), solids 60% by weight, from Bayer Ltd.
Alkyd resin[X4]; Trade name Phthalkyd V-901, vinyl-modified alkyd resin (hydroxyl group-containing compound), solids 50% by weight, from Hitachi Chemical Co., Ltd.
Liquid polybutadiene with hydroxyl groups at ends[X5]; Trade name Poly bd R-45HT, hydroxyl group-containing compound, solids 100% by weight, from Idemitsu Chemical Co., Ltd.
Hydrogenated liquid rubber with hydroxyl groups at ends[X6]; Trade name Epol, polyolefinic polyol with hydroxyl groups at ends (hydroxyl group-containing compound), solids 100% by weight, from Idemitsu Chemical Co., Ltd.
Polyisocyanate[X7]; Trade name Sumidule N-3500, polyisocyanate (isocyanate-containing compound), solids 100%, from Sumitomo Bayer, Co., Ltd.
Acidic catalyst[X8]; p-toluenesulfonic acid, solids 20% by weight (isopropyl alcohol solution)

TABLE 2

Formulation recipe of primers [Comparative example] [Parts by weight]

| Composition | Comp. example 1 | 2 | 3 | 4 |
|---|---|---|---|---|
| Ketonic resin[X1] 40% solution | — | 200 (80) | 125 (50) | 100 (40) |
| (a-I) 20% solution | 500 (100) | — | 250 (50) | — |
| (a-II) 20% solution | — | 100 (20) | — | — |
| (a-III) 20% solution | — | — | — | 300 (60) |
| Titanium dioxide | 100 | 100 | 100 | 100 |
| Carbon black | 0.8 | 0.8 | 0.8 | 0.8 |
| Solid concentration of primer | 30% | 35% | 35% | 35% |

Value in bracket means parts of solids by weight.
Ketonic resin[X1]; Same as in Table 1.

TABLE 3

Test results of coated film (Test of primer performance)

| | Spray paintability | High-octane gasohol resistance | Adherence | Warm water resistance | Moisture Resistance |
|---|---|---|---|---|---|
| Ex. 1 | Good spraying Painting is possible | After soaking for 60 min, no peeling off of coated film | 100/100 | No abnormality of coated surface Good adherence | No abnormality of coated surface Good adherence |
| Ex. 2 | Good spraying Painting is possible | After soaking for 60 min, peeling off of 5 crosscuts | 100/100 | No abnormality of coated surface Good adherence | No abnormality of coated surface Good adherence |

TABLE 3-continued

Test results of coated film (Test of primer performance)

|  | Spray paint-ability | High-octane gasohol resistance | Adherence | Warm water resistance | Moisture Resistance |
|---|---|---|---|---|---|
| Ex. 3 | Good spraying Painting is possible | After soaking for 60 min, peeling off of 1 crosscut | 100/100 | No abnormality of coated surface Good adherence | No abnormality of coated surface Good adherence |
| Ex. 4 | Good spraying Painting is possible | After soaking for 60 min, peeling off of 2 crosscuts | 100/100 | No abnormality of coated surface Good adherence | No abnormality of coated surface Good adherence |
| Ex. 5 | Good spraying Painting is possible | After soaking for 60 min, no peeling off of coated film | 100/100 | No abnormality of coated surface Good adherence | No abnormality of coated surface Good adherence |
| Ex. 6 | Good spraying Painting is possible | After soaking for 60 min, no peeling off of coated film | 100/100 | No abnormality of coated surface Good adherence | No abnormality of coated surface Good adherence |
| Comp. 1 ✕ | Poor spraying Painting is impossible | After soaking for 15 min, peeling off of overall coated film | 100/100 | No abnormality of coated surface Good adherence | No abnormality of coated surface Good adherence |
| Comp. 2 | Good spraying Painting is possible | After soaking for 5 min, peeling off of overall coated film | 50/100 | Generation of blisters on coated surface Poor adherence | Generation of blisters on coated surface Poor adherence |
| Comp. 3 | Good spraying Painting is Possible | After soaking for 7 min, peeling off of overall coated film | 100/100 | No abnormality of coated surface Good adherence | No abnormality of coated surface Good adherence |
| Comp. 4 | Good spraying Painting is possible | After soaking for 10 min, peeling off of overall coated film | 100/100 | No abnormality of coated surface Good adherence | No abnormality of coated surface Good adherence |

Comp. 1✕; The primer of Comparative example 1 did not become fine particles on spray painting, but became cobweb-like, making it impossible to spray paint, hence the solid concentration of primer was diluted to 20% for spray painting.

Testing Methods of Coated Film
High-Octane Gasohol Resistance

A mixed high-octane gasohol of toluene:isooctane:ethanol=45:45:10 (parts by weight) was prepared. Next, 100 crosscuts reaching the base were made at intervals of 3 mm on the coated surface, which was soaked into the high-octane gasohol. The performance of high-octane gasohol resistance was judged by the number of peeled crosscuts and the time until peeling off.

Adherence

On the coated surface, 100 crosscuts reaching the base were made at intervals of 2 mm and cellophane adhesive tape was stuck closely thereon, which was peeled off in the direction of 180° to examine the number of remaining crosscuts.

Warm Water Resistance

The coated plate was soaked for 240 hours into warm water of 40° C. to examine the state of coated film. Moreover, a scratch (✕ mark) reaching the base was engraved on the coated surface and cellophane adhesive tape was stuck closely thereon, which was peeled off in the direction of 180° to examine the adherence of coated film.

Moisture Resistance

The coated plate was allowed to stand for 240 hours in an atmosphere of 50° C. and relative humidity of 98% and, by the same method as in warm water resistance, the state of coated film and the adherence were examined.

EFFECT OF THE INVENTION

As evident from the results of Table 3, the primer having carboxyl group-containing chlorinated polyolefin (II) alone as a binder resin as in Comparative example 1 cannot be spray painted, unless the solid concentration is less than 20%. That is, it cannot correspond to high-solid primer. Also, as in Comparative examples 2 and 3, the systems formulated with no (A-3) being the prerequisite for the constitution of the invention show good spraying property, but they are poor remarkably in other performances, in particular, high-octane gasohol resistance.

Whereas, in the invention (Examples 1 through 6), the high-octane gasohol resistance improves by mixing the crosslinking component (A-3) and other performances are also satisfiable. From these facts, it can be seen that the invention is useful in the industry.

What is claimed is:

1. The binder resin composition for high-solid primer characterized by formulating 10 to 200 parts by weight of (A-3) shown below to 100 parts by weight of a mixture of (A-1) with (A-2) shown below within a range of mixing ratio by weight of (A-1/A-2) of 90/10 to 50/50, (A-1): Carboxyl group-containing chlorinated polyolefin graft copolymerized with 1 to 10% by weight of at least one kind of unsaturated carboxylic acid monomer selected from carboxylic acids and/or carboxylic anhydrides onto polyolefin (I), and then chlorinated to a chlorine content of 10 to 30% by weight, the carboxyl group-containing chlorinated polyolefin (II) having not more than 2% by weight of component with weight average molecular weight of 2,000 being low-molecular weight region of said carboxyl group-containing chlorinated polyolefin and ratio ($M_w/M_n$) of weight average molecular weight ($M_w$) to number aver-age molecular weight ($M_n$) of 1.5 to 3.5, (A-2): Ketonic resin with number average molecular weight of 500 to 2,000, (A-3): Combination of one set or two or more sets selected from alcoxylated melamine and carbamate group-containing compound, alcoxylated melamine and hydroxyl group-containing compound, and isocyanate group-containing compound and hydroxyl group-containing compound.

2. The binder resin composition for high-solid primer of claim 1, wherein the polyolefin (I) is crystalline polypropylene with weight average molecular weight of 10,000 to 150,000, propylene-α-olefin copolymer with weight average molecular weight of 10,000 to 150,000 containing 70 to 97 mol % of propylene component, the number of carbons of α-olefin being 2 or 4 to 6, or ternary copolymer of propylene-butene-ethylene with weight average molecular weight of 10,000 to 150,000 containing 70 to 97 mol % of propylene component, 2 to 25 mol % of butene component and 2 to 25 mol % of ethylene component.

* * * * *